US005706903A

United States Patent [19]

Odendahl et al.

[11] Patent Number: 5,706,903

[45] Date of Patent: Jan. 13, 1998

[54] TOOL

[75] Inventors: Alfred Odendahl, Waldenbuch; Karl Wanner, Leinfelden-Echterdingen, both of Germany

[73] Assignee: Robert Bosch GmbH, Stuttgart, Germany

[21] Appl. No.: 419,507

[22] Filed: Apr. 10, 1995

Related U.S. Application Data

[63] Continuation of Ser. No. 211,328, filed as PCT/DE92/00820, Sep. 24, 1992, Pat. No. 5,474,139.

[30] Foreign Application Priority Data

Sep. 26, 1991 [DE] Germany .......................... 41 32 023.9

[51] Int. Cl.[6] ............................ B23B 31/02; B25D 17/08

[52] U.S. Cl. ............................................ 173/104; 279/19.3

[58] Field of Search ........................... 173/104; 279/19.3, 279/19.5; 408/226

[56] References Cited

U.S. PATENT DOCUMENTS

| | | | |
|---|---|---|---|
| 3,916,435 | 10/1975 | Camplin . | |
| 4,107,949 | 8/1978 | Wanner et al. | 408/226 |
| 4,123,074 | 10/1978 | Wanner | 279/19.5 |
| 4,131,165 | 12/1978 | Wanner et al. | 279/19.3 |
| 4,206,820 | 6/1980 | Bailey et al. | 279/19.3 |
| 4,691,929 | 9/1987 | Neumaier et al. | 279/19.3 |
| 5,340,245 | 8/1994 | Bloechle et al. | 279/19.3 |
| 5,346,340 | 9/1994 | Runge | 408/226 |

FOREIGN PATENT DOCUMENTS

| | | |
|---|---|---|
| 0141990 | 9/1984 | European Pat. Off. . |
| 906434 | 9/1962 | United Kingdom . |
| 91 20119 | 12/1991 | WIPO . |

OTHER PUBLICATIONS

Patent Abstracts of Japan vol. 16, No. 227 (E-1207) May 26, 1992.

*Primary Examiner*—Scott A. Smith
*Attorney, Agent, or Firm*—Michael J. Striker

[57] ABSTRACT

A device on machine tools for transmitting a rotational and/or percussive movement to a tool (22) has two or three rotational drivers (14) which are arranged so as to be symmetrical with respect to rotation. The rotational drivers (14) are stepped and flank parts (16) extending radially to the center axis (15) alternate with guide portions (17) extending along a cylindrical outer surface. Locking members (20) which engage in depressions (28) at the tool (22) are arranged in the region of the rotational drivers (14) for the axial locking of the tools (10). With the tool holder (10) according to the invention, tool shafts having diameters between 8 and 12 mm can be clamped without converting or modifying the tool shafts. Good true running characteristics can be achieved in spite of the stationary rotational drivers (14).

4 Claims, 5 Drawing Sheets

TOOL

CROSS-REFERENCE TO RELATED APPLICATION

This application is a continuation application of Ser. No. 211,328 filed on Mar. 25, 1994, now U.S. Pat. No. 5,474, 139.

BACKGROUND OF THE INVENTION

The present invention relates to a tool for at least one of a drill chuck and a tool holder having a plurality of inwardly projecting rotational drivers. A tool holder which is constructed as a drill chuck and Whose rotational driving elements are formed by a plurality of gripping segments lying one on top of another is known from DE-U 85 10 262. The gripping segments have an approximately trapezoidal or circular cross-sectional shape, are curved in profile, and merge with one another in curved portions. The lateral surfaces of the rotational drivers are accordingly not planar and are arranged relative to the direction of the application of force in a disadvantageous manner for the transmission of torque.

SUMMARY OF THE INVENTION

Accordingly, it is an object of the present invention to provide a tool for at least one of a drill chuck and a tool holder, which avoids the disadvantages of the prior art.

In keeping with these objects and with others which will become apparent hereinafter, the tool has a shaft having an insertion end and provided with a plurality of grooves which are open toward said insertion end and arranged at angular intervals over at a circumference of said shaft, said grooves having planar lateral walls which are arranged approximately radially to a tool axis and connected by radial portions in the shape of a cylindrical outer surface.

When the tool is designed in accordance with the present invention it has the special advantage that a standardized shaft is not required. Rather, thinner and thicker tool shafts can be inserted into the same tool receptacle depending on the diameter of the tool head. This is achieved by means of stepped rotational driving slots or grooves. The greater the difference in diameter between tools, the more steps must be provided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE EMBODIMENT EXAMPLES

Figure 1:
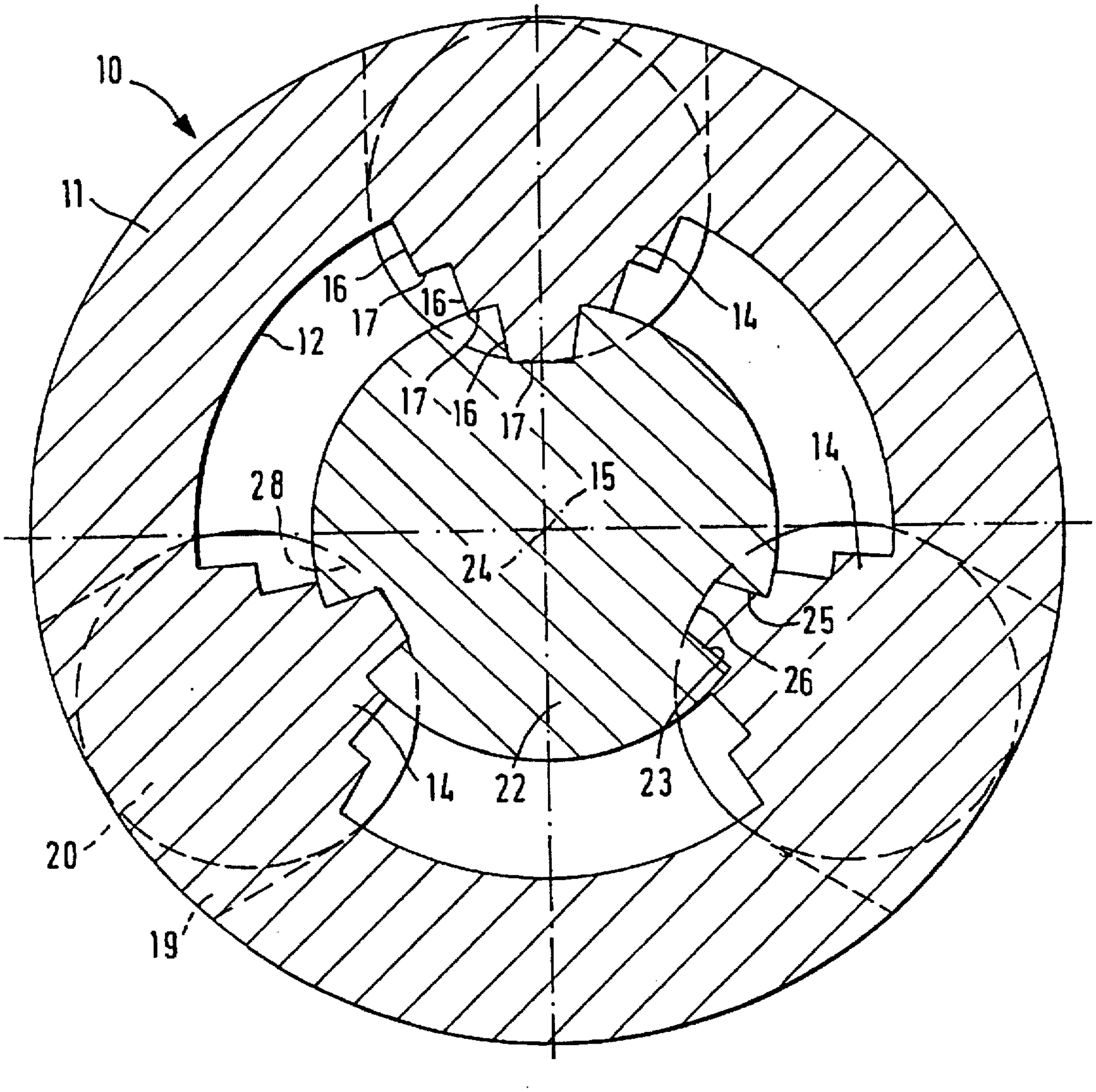
FIG. 1 shows a device on hand-held machine tools in cross section with an inserted tool shaft of small diameter.

The device according to the invention substantially has a tool holder 10 and a tool 22 held therein. A base body 11 of the tool holder 10 with a receptacle hole 12 is shown in section. In the first embodiment example, three identically constructed, stationary rotational drivers 14 project into the receptacle hole 12. The rotational drivers 14 have a stepped construction, and planar flank parts 16 extending radially with reference to the center axis 15 of the tool holder 10 alternate with guide portions 17 constructed with a cylinder-shaped outer surface in the circumferential direction. The receptacle hole 12 itself also acts as a guide portion. The rotational drivers 14 are stepped in such a way that the guide portions 17 are situated on a cylindrical outer surface having a diameter of 6 mm, 8 mm and 10 mm coaxially to the center axis 15. The receptacle hole 12 has a diameter of 12 mm.

The rotational drivers 14 extend a certain distance along the receptacle hole 12. Roughly in the center of this distance, the rotational drivers 14 are penetrated by an opening 19 which also penetrates the base body 11. Locking members 20 are inserted into the openings 19 and project somewhat beyond the projected area of the rotational drivers 14. The locking members 20 are advantageously constructed as balls, rollers or stepped locking bodies according to DE 35 06 008 A1 (=GB 21 71 340), whose contents are incorporated in this application.

A tool 22 is clamped in the tool holder 10. The tool 22 has grooves 23 which open out toward its shaft end and extend along the shaft for rotational driving. In the tool shown in FIG. 1, the latter are simple grooves without steps and with planar lateral walls 25 arranged radially to the tool axis 24 and a roughly planar base surface 26 connecting the lateral walls 25. In the region of the locking members 20, the tool 22 has three depressions 28 forming an extension of the grooves 23. The depressions 28 are advantageously elongated in the axial direction of the tool 22 and are longer than the locking members 20 by an amount corresponding to the idle path of the tool.

Figure 5:
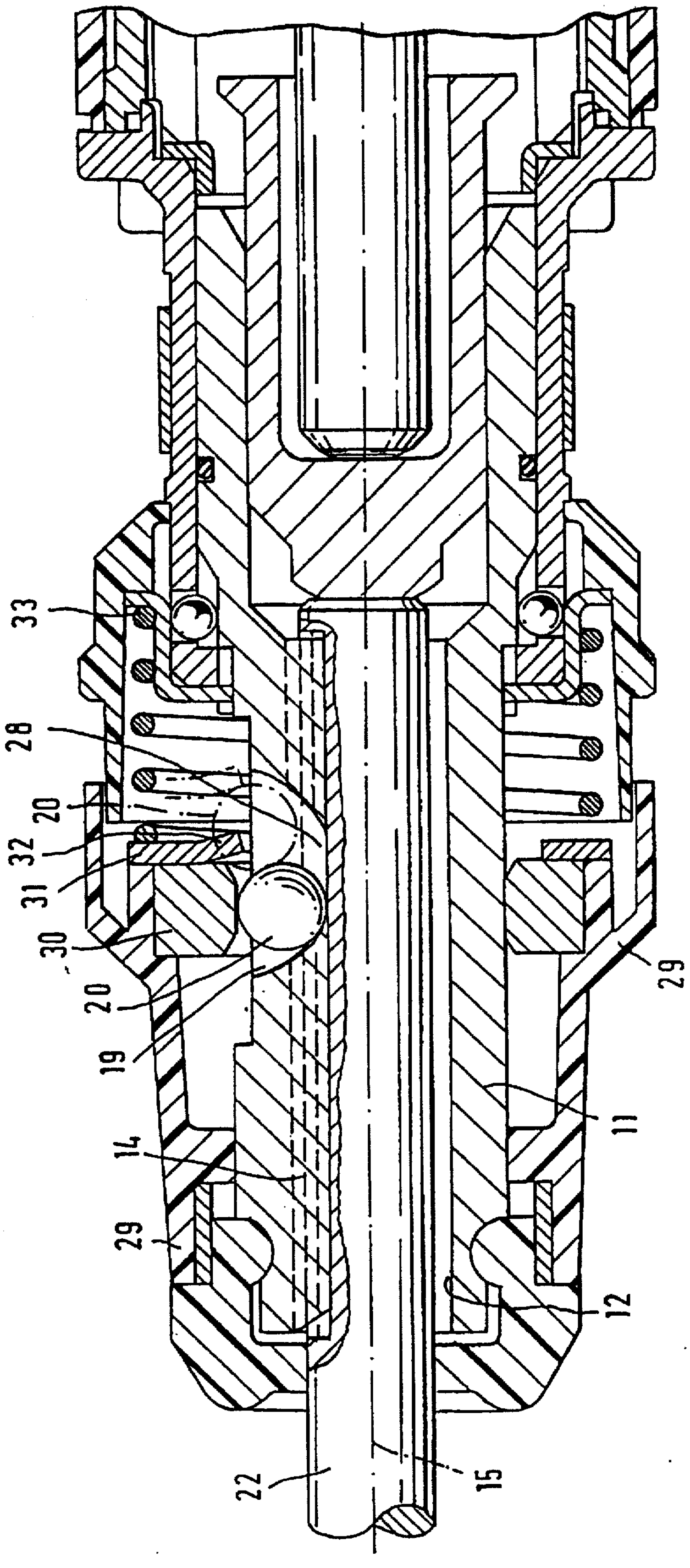
FIG. 5 shows a longitudinal section through a tool holder according to FIG. 2.

The tool holder 10 has a sliding sleeve 29 which surrounds the base body 11 and the locking members 20 and is longitudinally displaceable within limits (see also FIG. 5). It contains a thickened portion or a retaining ring 30 which secures the locking members 20 in the depressions 28. A plate ring 31 having elongations 32 in the region of the locking members 20 contacts the retaining ring 30 laterally. The plate ring 31 is pressed against the sliding sleeve 29 and the retaining ring 30 by a pressure spring 33.

As is shown in FIG. 5 in dashed lines, the locking members 20 are deflected radially against the force of the pressure spring 33 when a tool is inserted into the receptacle hole 17. When the tool shaft is fully inserted, the locking members 20 are forced back again by the pressure spring 33 into their initial positions so as to lock. In other respects, the design and operation correspond to the description in DE 32 05 063 C2 (GB 20 96 045 B2) whose contents are incorporated herein by reference.

The retaining ring 30 and plate ring 31 can be adapted to the locking members 20 in such a way that the position of the plate ring 31 indicates the penetration depth of the locking members 20 and accordingly the shaft diameter of the inserted tool. The position of the plate ring 31 or the position of a corresponding sleeve can then be referred to for the purpose of adjusting the speed of the drive motor. In this case, in contrast to the FIGS. 1 to 4, the depressions 28 would have to be constructed with different depths depending on the diameter of the shaft.

Figure 2:
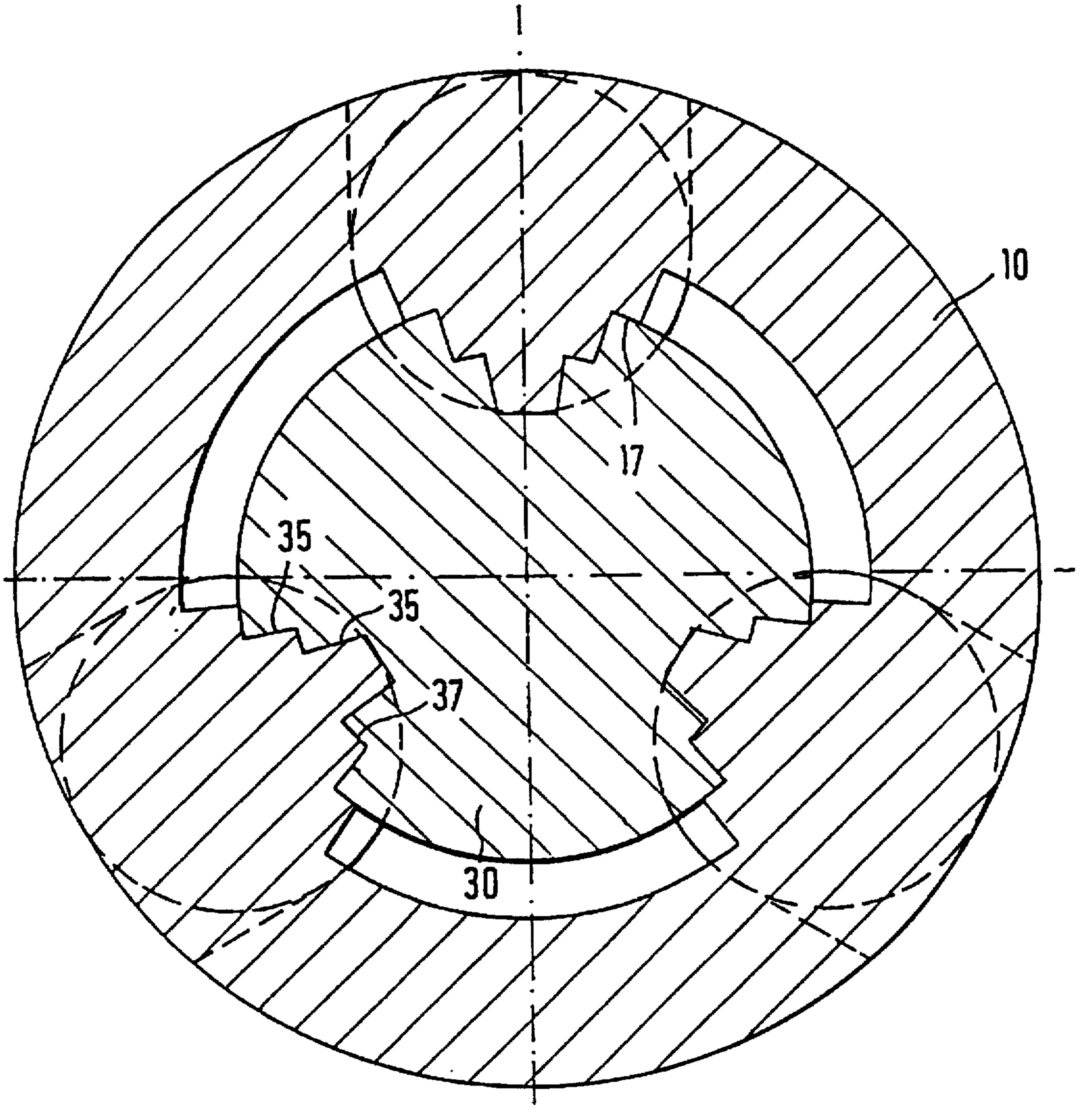
FIGS. 2 and 3 show the same device with inserted tools of different sizes.

The tool holder 10 shown in FIG. 2 is identical to that shown in FIG. 1, with the exception that a tool shaft 30 with a large diameter is now inserted. The tool 30 likewise has longitudinally extending grooves 33 which are formed by two pairs of lateral walls 35 which are offset in the circumferential direction. The grooves 33 are thus stepped and radial portions 37 are formed between the lateral walls 35. The radial portions 37 are adapted to the guide portions 17 of the tool holder 10 and extend along a cylindrical outer surface.

Figure 3:
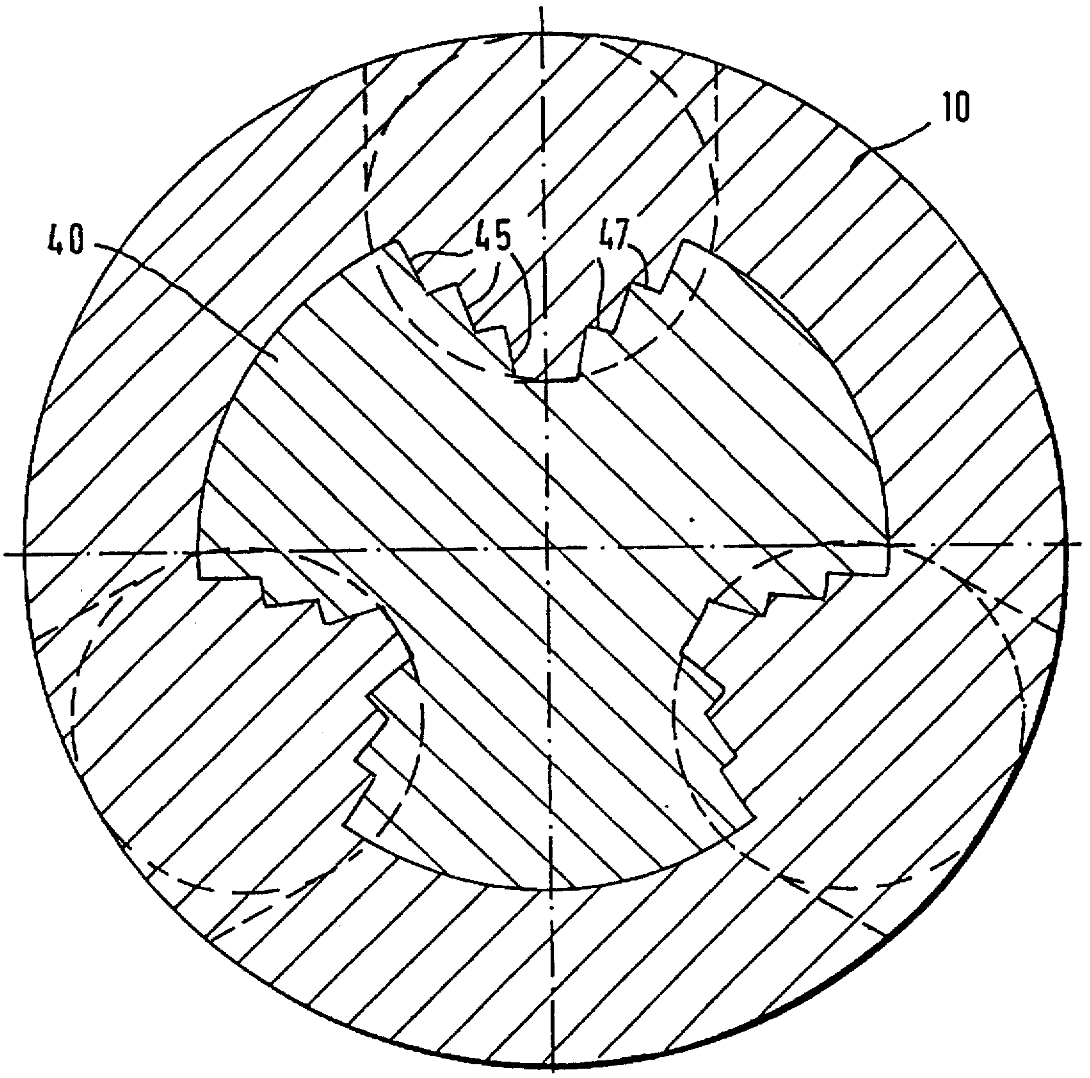

In FIG. 3, a third tool 40 is shown in the tool holder 10 which is identical to that shown in the previous figure. The shaft of the tool 40 has a diameter of 12 mm and contacts the receptacle hole 12. The grooves 43 have three steps instead of two steps as in the preceding figure. Three pairs of lateral walls 45 alternate with radial portions 47. In other respects, the tool 40 corresponds to the tools 22 and 30 shown above.

Figure 4:
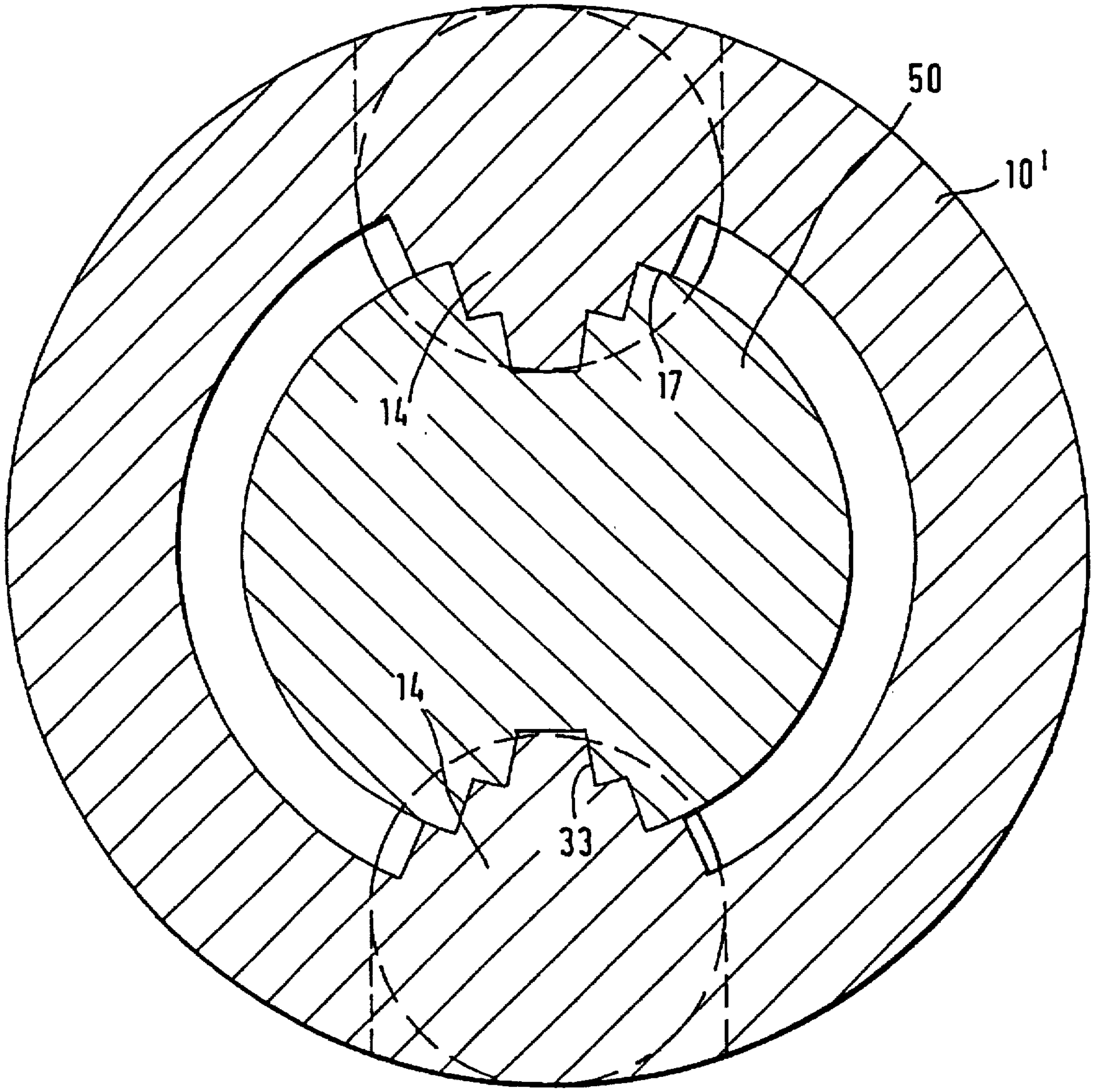
FIG. 4 shows a device with two rotational drivers in another embodiment example.

The second embodiment example according to FIG. 4 is distinguished from the first embodiment example only in that two rotational drivers 14 are constructed at the tool receptacle 10' and only two grooves 33 are constructed at the tool 50. It has the particular advantage that tools with two or four grooves at the shaft can also be clamped.

To insert a tool 22 into the tool holder 10, the rotational drivers 14 are aligned with the grooves 23 and the tool 22 is slid into the receptacle hole 12. When the end of the tool shaft reaches the locking members 20, the latter are deflected outward, preferably radially, and catch in the depressions 28 again as the tool is slid forward. The tool 23 may not readily be pulled out, since the locking members 20 are prevented, e.g. by a sleeve, from deflecting in this direction. To remove a tool, this sleeve must first be actuated by the user. The tool 22 is centered and guided by the guide portions 17 at the rotational drivers 14. This results in good true running or concentric running characteristics in spite of the stationary rotational drivers 14. To facilitate insertion of a tool, the rotational drivers can either be beveled at their front edge or the grooves 23 can be beveled at the end of the shaft. In the tool with a shaft of 10 mm, according to FIGS. 2 and 4, the centering and guidance is improved by additional guide portions 17.

Because of the stepped construction of the rotational drivers 14, the device, according to the invention, for transmitting a rotating and/or percussive movement to a tool is suitable for various shaft diameters without requiring any modification of the tool holder 10. Drilling tools with drill diameters between 4 mm and 8 mm receive a shaft diameter of 8 mm and are inserted into the tool holder 10 according to FIG. 1. Tools with drill diameters between 8 mm and 12 mm receive a 10-mm shaft according to FIG. 2. Tools with drill diameters greater than 12 mm are outfitted with a shaft diameter of 12 mm and fit into the tool holder 10 according to the invention with reference to FIG. 3.

The device according to the invention can also be used for mechanically sensing the size of the inserted tool. The depth of the depressions 28 are constructed differently with reference to the receptacle hole 17 depending on the drill head diameter. Consequently, the locking members 20 engage at different depths. The end position of the locking members 20 determines the position of a sensing sleeve within the tool receptacle as is described in DE 35 06 008 A1 (GB 21 71 340 B) whose disclosure is incorporated herein by reference. Depending on the position of the sensing sleeve, the speed of the drill is correctly adjusted corresponding to the drill diameter.

It will be understood that each of the elements described above, or two or more together, may also find a useful application in other types of constructions differing from the types described above.

While the invention has been illustrated and described as embodied in a tool for at least one of a drill chuck and a tool holder, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various application without omitting features that, from the standpoint of prior art, fairly constitute essential characteristics of the generic or specific aspects of this invention.

What is claimed as new and desired to be protected by the Letters Patent is set forth in the appended claims.

What is claimed is:

1. A tool for at least one of a drill chuck and a tool holder having a plurality of inwardly projecting rotational drivers with flanks extending approximately radially and connected by guide portions, for a hand-held drill or hammer device, the tool comprising a shaft provided with a plurality of grooves which are arranged to receive the drivers and located at angular intervals at a circumference of said shaft, said grooves having at least on one side a plurality of substantially planar lateral walls which are arranged approximately radially to a tool axis in a stepped manner and are connected with one another by connecting portions.

2. A tool as defined in claim 1, wherein said connecting portions extend along a cylindrical outer surface.

3. A tool as defined in claim 1, wherein said grooves are spaced from one another by equal angular intervals.

4. A tool as defined in claim 1, wherein said shaft has depressions which form axial extensions of said grooves.

* * * * *